Oct. 8, 1935.  S. MALUSS ET AL  2,016,506
MEANS FOR AND METHOD OF CONTROLLING THE
OPERATION OF PICTURE AND/OR SOUND FILMS
Filed Jan. 17, 1935  2 Sheets-Sheet 1

INVENTORS
Stanley Maluss
Irving H. Yadwin
BY
A. D. T. Libby
ATTORNEY

Oct. 8, 1935.  S. MALUSS ET AL  2,016,506
MEANS FOR AND METHOD OF CONTROLLING THE
OPERATION OF PICTURE AND/OR SOUND FILMS
Filed Jan. 17, 1935  2 Sheets-Sheet 2
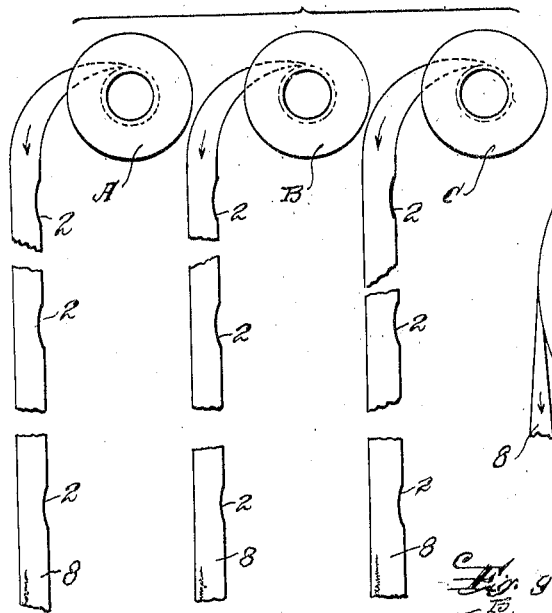
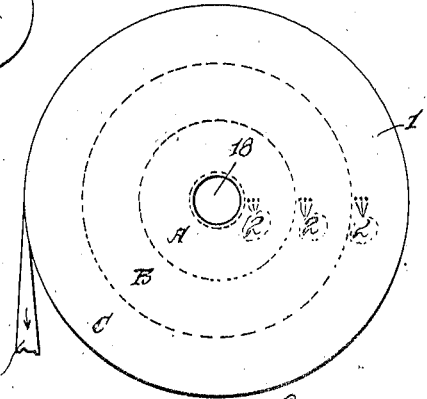
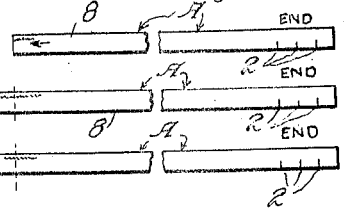
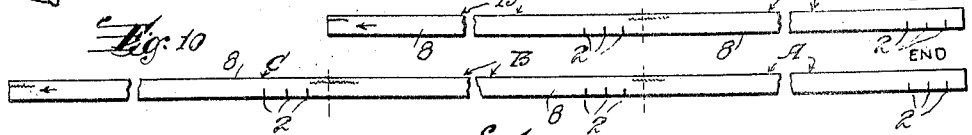
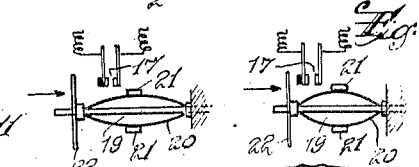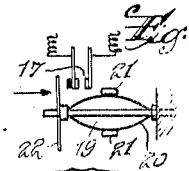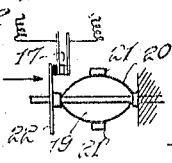
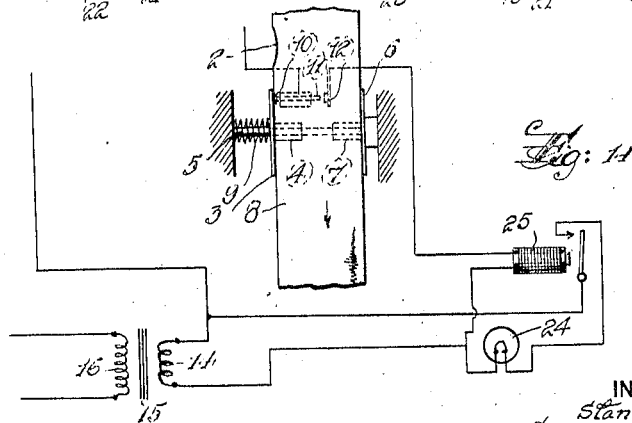
INVENTORS
Stanley Maluss
Irving H. Yadwin
BY
A. D. T. Libby
ATTORNEY Patented Oct. 8, 1935

2,016,506

UNITED STATES PATENT OFFICE 2,016,506

MEANS FOR AND METHOD OF CONTROLLING THE OPERATION OF PICTURE AND/OR SOUND FILMS

Stanley Maluss and Irving H. Yadwin, Newark, N. J.

Application January 17, 1935, Serial No. 2,206

6 Claims. (Cl. 177—311)

This invention relates to a method of controlling the operation of films used in moving pictures, whether or not the films are for silent pictures or sound, or a combination of both.

In the operation of such films, where the picture, for example, requires a plurality of films, or more than can be readily placed on one reel, it is the practice at present to put certain marks, such as dots, holes, scratches and other mutilations, on the film, to notify the operator that the film is nearing the end, so that he can start up certain mechanism on another projecting machine, in order to bring in the film on the next projector machine, thus making the least possible break on the screen between the two different reels of film.

The operator-notification means as above mentioned, however, has not proven fully satisfactory for a number of reasons. One is that the mutilation on the film is shown on the screen. Where films are interchanged from one picture theatre to another, each projection machine operator has his own markings that he prefers to use and he mutilates the film, in many cases cutting out the old mutilations, and adds his own markings with a consequent shortening of the film and even cutting out certain scenes that should be projected on the screen. Furthermore, at the instant this marking may be passing on the screen, the operator's attention might be attracted elsewhere, so that he does not even see the notification characters. While it has been proposed to make a switch of the kind described automatic, we have found that the manual shift from one machine to the other will produce better results if the operator is properly warned or notified that the reel being shown on the screen is approaching its end.

It is therefore the principal object of our invention to provide a suitable control means and method of operation which will give the best continuity in the operation of films and thereby produce a better effect on the screen.

Our improvement in the control of film operation will be readily understood by reference to the annexed drawings wherein:

Figure 6 is a diagrammatic view of three independent films as received from the producer, each having notches along one edge thereof near the end of the film.

Figure 7 is a view of a compound film comprising a plurality of the individual films shown in Figure 6; that is to say, the three films of Figure 6 are re-reeled onto one reel into a compound film as shown in Figure 7.

Figure 8 illustrates in plan diagrammatically one of the films; for example A, of Figure 6.

Figure 9 shows a compound film composed of two of the films A and B of Figure 6.

Figure 10 is a compound film made up of the three films A, B and C of Figure 6.

Figure 11 shows a part of the control mechanism for the signal circuit shown in Figure 1, in the initial operating position of the compound reel as shown in Figure 7.

Figure 12 is a view similar to Figure 11, but showing the position of the actuating mechanism of the control contact in another succeeding step in the operation of the compound film of Figure 7.

Figure 13 shows the last step in the operation of part of the control mechanism of Figure 1, or the succeeding step following those shown in Figures 11 and 12.

Figure 14 shows a modified form of signal circuit arrangement.

Figure 1:
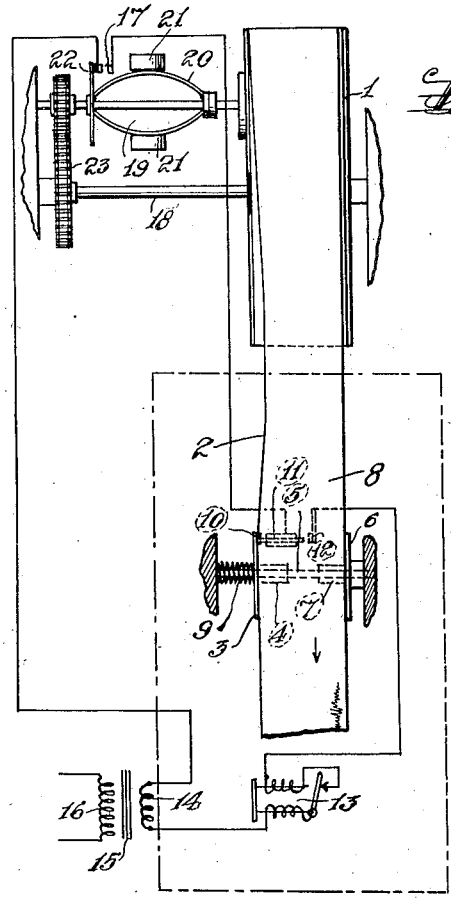
Figure 1 is a schematic plan view of one means employed in carrying out our method of control.
Figure 2:
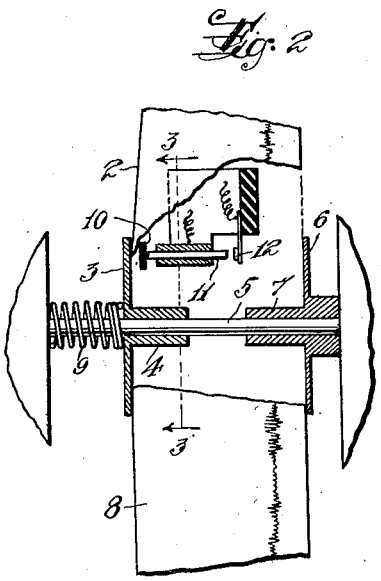
Figure 2 is an enlarged view of part of the apparatus shown in Figure 1.
Figure 3:
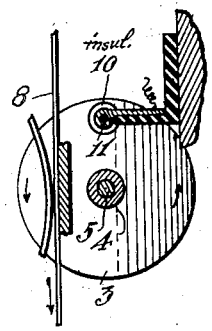
Figure 3 is a view on the line 3—3 of Figure 2.
Figure 4:
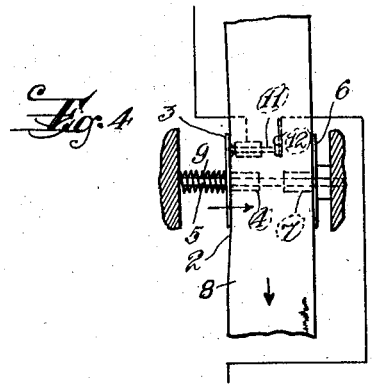
Figure 4 is a view of one of the contact mechanisms shown in Figure 1, but with the contact in closed position.
Figure 5:
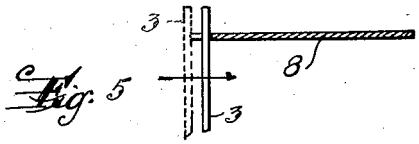
Figure 5 is a view of the contact-operating mechanism of Figure 4 shown in two positions.

In the various views, wherein like numbers refer to corresponding parts, I is a reel on which is wound a plurality of film sections, for example the sections A, B and C of Figure 6, as they are received from the film producer. It is the usual practice to furnish these films in small reels which the operator re-reels onto one large reel into a compound film as shown in Figures 7 and 10. Each of the sections A, B and C is provided with one or more notches 2 along one edge and near the end of the film section. These notches comprise small portions cut from the edge of the film in a very gradual or tapered manner as indicated in Figure 1, so that they are hardly perceptible on the screen, but yet sufficient to cause movement of a disc 3 carried on a hub 4 supported in turn on a shaft or spindle 5. The disc 3 may be rotatable on the shaft 5 together with a co-operating disc 6 carried on its hub 7 supported on the same spindle 5. The discs 3 and 6 act to guide the film 8 as it comes from the reel.

The disc 3 is held in engagement with the edge of the film 8 by some resilient means as spring 9 so that when one of the notches 2 in the film comes to the disc 3, the same will move laterally toward the disc 6 into the notch 2 engaging preferably an insulated head 10 on the end of a movable pin 11, causing it to engage a cooperating contact member 12 connected in electrical circuit including a signal 13 which, in the form shown in Figure 1, is in the nature of a buzzer connected to the secondary 14 of a low voltage transformer 15 having a primary 16 adapted to be connected to any suitable source of current. Since most of the lighting supply circuits at the present time are alternating current, we have shown the transformer 15 as the source of current for the signal circuit, although it is obvious that any other satisfactory source of current, such as a battery, may be substituted.

From what has been said, it is evident that in a film made up of sections, the contact 12 will be closed one or more times, depending on the number of notches at the end of each of the sections, but no signal will be given because the electrical circuit includes a second contact 17 which is controlled by means dependent on the speed of rotation of the compound reel shaft 18. As the speed of the film 8, in feet per minute, is held constant, the reel shaft 18 turns rather slowly while the outer film section C is being unreeled. This is obvious because of the larger diameter of the reel at this time. Therefore, as the film sections C and B, assuming that there are three sections all together on the reel 1, are unreeled, no signal will be given because the contact 17 remains open and does not close until the speed of rotation of the shaft 18 reaches a certain range within the limits of the last film section A and prior to the time that the first approaching notch 2 reaches the disc 3.

Figures 11, 12 and 13 indicate diagrammatically the various positions of a governing device 19 which may be in the form of a centrifugal governor having springs 20 and weights 21 acting on a member 22 to close the contact 17. The governor 19 may be operated from the shaft 18 in any satisfactory manner as by sprockets and chains 23, or gears.

We have found it preferable to give the operator more than one signal that the end of the entire reel is being reached, and as illustrated, three notches 2 will give him three signals through the actuation of the contact 12 as described, it being understood, as has been explained, that prior to reaching the first notch 2, the contact 17 has been closed. This will cause the signal 13 to give three different and distinct signals, thereby warning the operator to start the motor on the other projector and to have things in readiness to cut in the second machine at the proper time.

In Figure 14, we have shown a visible signal 24 controlled by relay 25 in place of the audible signal of Figure 1. Both types of signals may be used in combination if desired.

As shown in Figures 8, 9 and 10, the notches 2 are diagrammatically illustrated by the lines 2. The film sections are also indicated as having sound waves thereon, together with pictures, and as has been indicated, our invention is applicable for use with one film section or a plurality thereof. In certain cases, where only one film section is supplied by the producer, the control contact 17 with the associated mechanism may be dispensed with and the signal given direct by the contact 12.

From what has been said, it will be seen that we have worked out a method of controlling the operation of films in which the prior mutilation of the films is entirely eliminated, thereby saving the operator's time in putting his signal markings on the films and effecting a further saving in the films themselves, and at the same time eliminating the prior distasteful markings from the vision of the public viewing the films. Furthermore, by giving the operator of the projector machine timely and sufficient warning that the end of the film then being shown is being reached, he is enabled to have the other projector machine in condition to continue the picture being shown on the screen with the least possible break in continuity, thus inuring to the smoothness of the presentation of the picture and to the better satisfaction of the public.

What we claim is:

1. Means for controlling the operation of films of the character described in which a compound film is made by reeling onto one large reel a plurality of film sections, said means including at least one notch in the edge of and near the end of each of said film sections, electrical contact members and an operating device therefor, said device being actuated by said notch to close said contact members, an electrical signal circuit having said contact members therein, and a further contact in the electrical signal circuit with means for closing the contact only when the last film section has been reached, whereby the first-mentioned contact members on being closed by one of said notches in the last section will cause the signal in the said circuit to operate.

2. Means for controlling the operation of films as set forth in claim 1, characterized in that said second-mentioned contact is controlled by means dependent on the revolution speed of said large reel.

3. Means for controlling the operation of films as set forth in claim 1, characterized in that said second-mentioned contact is controlled by a centrifugal governor operated by the rotation of said large reel.

4. Means for controlling the operation of films as set forth in claim 1, characterized in that said first-mentioned contact is operated by a disc member resiliently held in engagement with that edge of the film having the notches therein.

5. Means for controlling the operation of films of the character described in which a compound film is made by reeling onto one large reel a plurality of film sections, said means including at least one notch in the edge of and near the end of at least the inner film section, a member resiliently held in engagement with that edge of the film having the notch therein, a signal circuit, an electrical contact in said circuit closed by said member when said member passes into said notch as the film travels off the reel, and a second electrical contact in said circuit held open by means operated when the large reel is turned until at a time after the inner section of the compound film is reached but closed before said first contact is closed.

6. Means for controlling the operation of a film including a notch in the edge of the film, a member resiliently held in engagement with that edge of the film having the notch therein, a signal circuit having an electrical contact closed by said member when it passes into said notch as the film travels off its reel, and a second electrical contact in said circuit for controlling the actuation of the signal in said circuit, said second contact being closed only when the rotation of the film reel reaches a predetermined high range and before said first contact is closed as and for the purpose described.

STANLEY MALUSS.
IRVING H. YADWIN.